US010474151B2

United States Patent
Netter

(10) Patent No.: US 10,474,151 B2
(45) Date of Patent: Nov. 12, 2019

(54) METHOD FOR GUIDING A VEHICLE SYSTEM IN A FULLY AUTOMATED MANNER, AND MOTOR VEHICLE

(71) Applicant: Audi AG, Ingolstadt (DE)

(72) Inventor: Florian Netter, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/069,465

(22) PCT Filed: Dec. 13, 2016

(86) PCT No.: PCT/EP2016/080797
§ 371 (c)(1),
(2) Date: Jul. 11, 2018

(87) PCT Pub. No.: WO2017/125209
PCT Pub. Date: Jul. 27, 2017

(65) Prior Publication Data
US 2019/0018415 A1    Jan. 17, 2019

(30) Foreign Application Priority Data
Jan. 19, 2016    (DE) .......... 10 2016 000 493

(51) Int. Cl.
*B60T 7/12*    (2006.01)
*B60T 7/00*    (2006.01)
(Continued)

(52) U.S. Cl.
CPC .......... *G05D 1/0088* (2013.01); *B60W 30/12* (2013.01); *B60W 30/16* (2013.01);
(Continued)

(58) Field of Classification Search
None
See application file for complete search history.

(56) References Cited

U.S. PATENT DOCUMENTS 5,410,477 A * 4/1995 Ishii .................. B60T 8/174
701/102
5,751,915 A   5/1998 Werbos
(Continued)

FOREIGN PATENT DOCUMENTS

DE    4209150 A1    9/1992
DE    4425957 C1    3/1996
(Continued)

OTHER PUBLICATIONS

International Preliminary Report on Patentability derected to related International Patent Application No. PCT/EP2016/080797, dated Jul. 24, 2018, with attached English-language translation; 13 pages.
(Continued)

*Primary Examiner* — Adam D Tissot
(74) *Attorney, Agent, or Firm* — Sterne, Kessler, Goldstein & Fox P.L.L.C.

(57) ABSTRACT

The invention relates to a method for operating a motor vehicle system which is designed to guide the motor vehicle in different driving situation classes in a fully automated manner. The method includes ascertaining a current driving situation class from multiple specified driving situation classes using at least some of driving situation data, each driving situation class is assigned at least one analysis function. The method further includes retrieving configuration parameter sets assigned to the analysis functions of the current driving situation class from a database and producing analysis units which carry out the analysis function and which have not yet been provided by configuring configuration objects using the retrieved configuration parameter sets.

20 Claims, 1 Drawing Sheet

(51) Int. Cl.
*G05D 1/00* (2006.01)
*B60W 30/12* (2006.01)
*B60W 30/16* (2012.01)
*G08G 1/0967* (2006.01)
*B60W 50/00* (2006.01)

(52) U.S. Cl.
CPC . *G08G 1/096725* (2013.01); *G08G 1/096741* (2013.01); *G08G 1/096775* (2013.01); *B60W 2050/0004* (2013.01); *B60W 2050/0057* (2013.01); *G05D 2201/0213* (2013.01)

(56) References Cited

U.S. PATENT DOCUMENTS

| | | | | |
|---|---|---|---|---|
| 7,386,389 | B2* | 6/2008 | Stolle | G05B 13/027 701/106 |
| 7,639,841 | B2* | 12/2009 | Zhu | G06K 9/00335 340/435 |
| 7,953,521 | B2* | 5/2011 | Tipping | G05B 13/0265 273/442 |
| 2002/0128751 | A1* | 9/2002 | Engstrom | G05B 13/027 701/1 |
| 2016/0161950 | A1* | 6/2016 | Frangou | B60W 30/12 701/27 |

FOREIGN PATENT DOCUMENTS

| | | |
|---|---|---|
| DE | 4447642 B4 | 10/2006 |
| DE | 102007023000 A1 | 12/2007 |
| DE | 102008057199 A1 | 7/2009 |
| EP | 1527940 A1 | 5/2005 |
| WO | WO 2005052883 A1 | 6/2005 |
| WO | WO 2014147361 A1 | 9/2014 |

OTHER PUBLICATIONS

English-language Abstract of German Patent Application Publication No. DE 4425957 C1, published Mar. 14, 1996; 1 page.
English-language Abstract of German Patent Application Publication No. DE 102007023000 A1, published Dec. 6, 2007; 1 page.
English-language Abstract of German Patent Application Publication No. DE 102008057199 A1, published Feb. 7, 2009; 1 page.
English-language Abstract of German Patent Application Publication No. DE 4447642 B4, published Oct. 26, 2006; 1 page.
English-language Abstract of European Patent Application Publication No. EP 1527940 A1, published May 4, 2005; 1 page.
International Search Report and Written Opinion of the International Searching Authority directed to related International Patent Application No. PCT/EP2016/080797, dated Mar. 7, 2017, with attached English-language translation of the International Search Report and Part V of the Written Opinion; 19 pages.

* cited by examiner

METHOD FOR GUIDING A VEHICLE SYSTEM IN A FULLY AUTOMATED MANNER, AND MOTOR VEHICLE

TECHNICAL FIELD

The invention relates to a method for operating a motor vehicle system which is designed to guide the motor vehicle in different driving situation classes in a fully automated manner, where:

a computing structure comprising multiple analysis units is used to ascertain control data to be used from surroundings data describing the surroundings of the motor vehicle and ego data describing the state of the motor vehicle as driving situation data for guiding the motor vehicle in a fully automated manner and to use the control data in order to guide the motor vehicle, each analysis unit ascertains output data from output data of at least one other analysis unit and/or driving situation data, and at least some of the analysis units are designed as a neural net at least partly on the basis of software. In addition, the invention relates to a motor vehicle.

BACKGROUND

A topical subject of research and development is the fully automated guidance of motor vehicles by means of a corresponding vehicle system ("piloted driving"). A vehicle system which is supposed to completely take over the guidance of the motor vehicle, i.e., particularly the longitudinal and lateral guidance, must analyze driving situation data which describe the surroundings of the motor vehicle as surroundings data, and as ego data describe the current state of the motor vehicle, particularly with regard to the dynamics. Surroundings data can be ascertained through measurements of environmental sensors, for example, cameras, radar sensors, and the like, but it is also conceivable to ascertain information differently, for example, through motor vehicle-to-motor vehicle communication, motor vehicle-to-infrastructure communication and/or from digital maps, particularly in connection with a current position information of the motor vehicle. Ego data, for example, the current speed of the motor vehicle, current acceleration values, and the like are frequently already ascertained within the motor vehicle, either by means of an internal sensor system or by querying operational parameters of other vehicle systems. For a compact imaging of surroundings data, surroundings models have already been proposed in the prior art.

These driving situation data must be analyzed by means of a computing structure, which can comprise hardware and/or software components, and converted into control data which determine the further movement of the motor vehicle and are used for controlling corresponding further vehicle systems, for example, an engine, a braking system, a steering system, and the like. For that purpose, different algorithms, construable as separate analysis units, are generally used which can be realized both by means of hardware or software. Such analysis units which, within the computing structure, convert input data, which can comprise driving situation data and/or output data of other analysis units, into output data, which can already contain control data, are frequently also called "decision makers" because they make the necessary decisions for the respective maneuvers during the fully automated operation of the motor vehicle.

For the realization of such analysis units, mainly approaches from the area of logic and algorithms, which calculate the necessary decisions for specified situations with selected parameters, are currently used. However, for the fully automated operation of the motor vehicle, this raises the problem that for all eventualities, including their combinatorics of the physical world, a corresponding decision algorithm or a corresponding decision logic would have to be realized. While something of this kind already proves to be difficult for vehicle systems usable only for specific driving situations, for example, parking, this problem exponentiates in vehicle systems to be used in multiple driving situation classes such that it is ultimately impossible to take into account all possible occurring driving situations. If conventional decision algorithms and/or decision logics are used, an automatic adaptation of the preprogrammed software or predefined hardware to new and unknown driving situations is not possible due to the fixed and rigid realization.

It has been proposed in the prior art to use neural nets as artificial intelligence at least for specific manageable applications, e.g. cruise control automatons, cf. for example DE 44 25 957 C1. Neural nets, which are also called artificial neuronal networks, are nets made of artificial neurons. Such a neural net has a specific topology, i.e. an assignment of connections to nodes, wherein a weighting, a threshold value and/or an activation function can eventually be assigned to each neuron. In a training phase, a neural net is trained on the basis of situations in order to subsequently be able to make correct decisions in similar situations.

However, with regard to vehicle systems designed to guide motor vehicles, particularly in multiple driving situation classes, in a fully automated manner, the problem arises that each of such neural nets can only be trained for a specific traffic situation, for example, for the intelligent and accident-free crossing of an intersection, the recognition of the intention of other traffic participants, for sub-aspects of automated parking processes, situation analyses on the interstate highway during overtaking maneuvers, and the like. Even though it is possible to generalize within this specific analysis function by the neural net, but due to the complexity of reality, it is not possible to create a neural net or a group of neural nets which can be applied unconditionally to all conceivable traffic situations. However, due to the possible computing power available in modern motor vehicles, it is also not possible to realize an extremely high number of individual analysis functions through neural algorithms.

WO 2011/147 361 A1 discloses an apparatus for controlling a land vehicle which is self-driving or partially self-driving. The idea is that of realizing an artificial prediction using adaptive model-based cognition controls. Thereby, an essential level of inferential thinking and real-time communication is supposed to be constituted with the fusion of available sensors.

DE 44 25 957 C1 relates to a device for controlling the speed of a motor vehicle, where it is proposed to provide a speed regulator with an artificial neural net which is supplied with data about the current speed control deviation and the current travel state, and at least one corrective signal for the powertrain is generated after previous training using a non-linear vehicle longitudinal dynamic model. As a result, low driving speeds can also be adjusted more reliably.

BRIEF DESCRIPTION OF THE DRAWINGS/FIGURES

DETAILED DESCRIPTION

Figure 1:
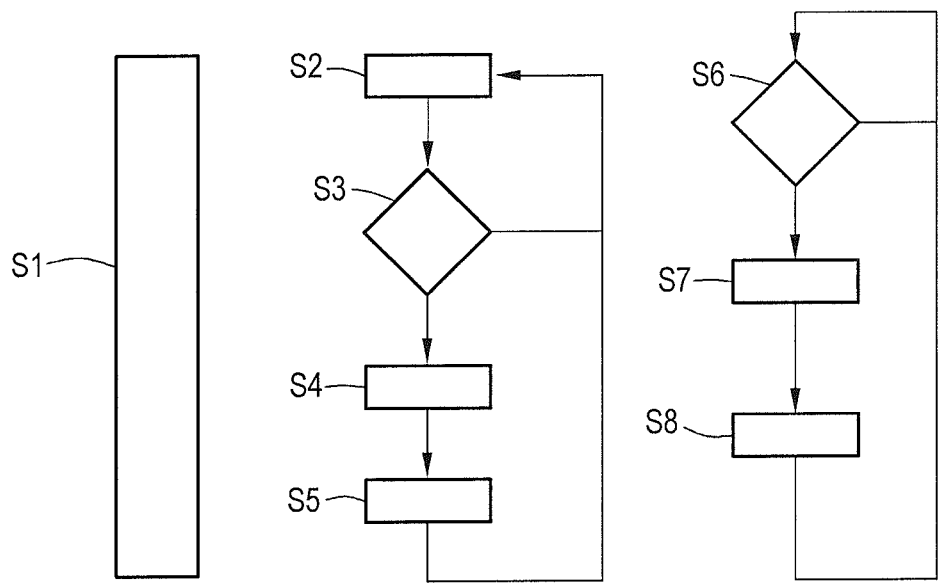
FIG. 1 illustrates a flowchart of a method, according to one embodiment of the disclosure.

The invention therefore addresses the problem of implementing a multiplicity of neural nets for different traffic situations during the fully automated guidance of the motor vehicle despite limited computing power capacity in the motor vehicle, and thus improving the quality and reliability of the control data ascertained from a computing structure.

For solving the problem, it is, according to the invention, provided in a method of the initially described type that at least some of the analysis units designed as a neural net are produced dynamically from a configuration object which can be configured using configuration parameter sets during the runtime, where:

a current driving situation class is ascertained from multiple specified driving situation classes, each driving situation class being assigned at least one analysis function, using at least some of the driving situation data, configuration parameter sets assigned to the analysis functions of the current driving situation class are retrieved from a database, and analysis units which carry out the analysis function and which have not yet been provided are produced by configuring configuration objects using the retrieved configuration parameter sets.

Therefore, the idea on which the invention is based is that of situationally adjusting the artificial intelligence for the fully automated guidance of the motor vehicle by producing and incorporating into the modular computation structure suitable artificial neural nets, if not already active, during the runtime, i.e. when the computing structure is used, for a current driving situation class. For that purpose, a configuration object is used, from which an analysis unit can be produced if a corresponding configuration parameter set is available, the analysis unit containing a corresponding neural net and producing the analysis function. The configuration parameter set thus contains particularly configuration data on the topology (neuron structure), on activation functions, on weights and/or threshold values.

According to the invention, there are multiple options for realizing the configuration object. For example, the configuration object can comprise hardware and/or software. GPUs, FPGAs and/or neural chips offer themselves as hardware basis particularly also for configurable neural nets. For example, each configuration object can correspond to a configurable hardware component. Thus, a hardware is used which is particularly suitable for the realization of neural nets, and so the neural nets can be achieved quickly and effectively. However, it is naturally also conceivable that at least some of the configuration objects are purely software-based, i.e., particularly analysis units are produced as software objects during the runtime in a storage device and configured according to the configuration parameter set. In this case, for example, a programming-related rudiment structure class exists for the realization of neural nets, wherein a concrete entity of this rudiment structure class is produced as analysis unit using the configuration parameter set. As a result, the produced entity constitutes a program component which can be or is embedded in the sequence of the entire computing structure and which can be correspondingly retrieved by other functions/analysis units. Such a design of the configuration object, particularly based purely on software, has the advantage of increased flexibility, wherein the number of possible neural nets can be limited, for example, by means of the available internal memory.

The configuration parameter sets are stored in a database. In order to be able to retrieve suitable configuration parameter sets, at first a driving situation class is determined. Driving situation classes ultimately combine a set of operating conditions, under which the motor vehicle can be operated. In principle, the driving situation class thus comprises a multiplicity of possible driving situations which are nevertheless connected by commonalities. Therefore, driving situation classes can also be described as operational surroundings. For example, it can be provided that a driving situation class results from a combination of a specific driving surroundings, for example, city traffic, rural road, interstate highway, off-road, and the like, with a speed interval in order to be able to differentiate congested surroundings on interstate highways from normal operating conditions on the interstate highway, and the like. For example, driving surroundings can be determined via a digital map of a navigation system of the motor vehicle, particularly together with a current position information of the motor vehicle, particularly a GPS information. The current speed of the motor vehicle is already known inside the motor vehicle; if necessary, average speeds can also be viewed in a sliding time window.

In the database, analysis functions, which are particularly likely to be required in the database, and associated configuration parameter sets are associated with each driving situation class. Analysis functions, for example, can comprise pedestrian recognitions or overtaking decision makers, or generally speaking, classifiers, predictors, for example, of the intention of other traffic participants, and/or situation analyzers, which, within the scope of the present invention, are realized through neural nets which are described by the configuration parameter sets with regard to the configuration object. In other words, the presence of the configuration parameter set and the configuration object is sufficient to dynamically generate a corresponding analysis unit which uses a neural net, and to activate it within the computing structure.

Ultimately, the data (topology, parameterization, etc.) characterizing the different neural nets required in different driving situation classes are stored in a database and downloaded according to the situation into a control device in order to realize and activate the corresponding neural net(s). For that purpose, a database proves to be particularly useful because the configuration parameters can be stored in an efficient and flexible data structure.

For example, if the driving situation class is a drive on an interstate highway at higher speeds, a neural net would be used which, for example, is specifically adjusted to and trained for overtaking maneuvers and/or cross traffic at high speeds, while a neural net, which recognizes pedestrians and/or attempts to predict their intention would not be active in the computing structure because during drives on interstate highways at high speed, usually no pedestrians are expected. The respective neural nets can thus be effectively discarded or discharged from the memory but are still available in the database via the corresponding configuration parameter sets. However, in case of congestion in this example, i.e. lower speeds and thus a change of the driving situation class, pedestrians can very well be expected, while overtaking maneuvers at higher speeds are no longer required. Therefore, a neural net acting, for example, as a classifier for pedestrian recognition and/or pedestrian intention recognition, can be loaded dynamically on-demand and activated. Of course, the disclosure is not limited to the herein exemplifying driving situation classes, analysis functionalities and neural nets as well as their allocation, and as understood by a person skilled in the art, a multiplicity of possible designs is conceivable.

An advantageous design of the present invention provides that the driving situation class itself is determined by a neural net. The division in driving situation classes, particularly immediately proceeding from driving situation data, frequently proves already to be a very complex assessment problem which can be solved via (basically active) neural nets.

As already indicated, the analysis units configured as neural nets which perform the analysis functions, and which are expediently not associated with the current driving situation class, are deactivated, and/or basically only a maximum number of the analysis units, which are based on neural nets, are active simultaneously. With this approach, it is possible to use the free and limited computing capacities in the motor vehicle for different tasks or neural nets. The result is greatest possible flexibility and simultaneously improved functional quality of the vehicle system as a whole because computing capacities are allocated in a flexible manner to neural nets that currently require them, and computing capacities, which are currently not required, can be used elsewhere.

It is further expedient if at least one analysis unit, which realizes a basic function through a neural net, is always active. Specific problems solved by neural nets are required in each driving situation, regardless of the driving situation class. For example, the basic function can be an object recognition and/or a classification function. Output data of such an analysis unit, which realizes a basic function, can in embodiments moreover also be used to refine the determination of the driving situation class; for example, it is possible to tie the activation of specific neural nets, or the dynamic realization of analysis units realized by the neural nets, to previous situation properties, for example, coupling a pedestrian intention recognition to the presence of pedestrians, and the like. In such case, a very particular division of specific driving situation classes is thus similarly possible as an adaptation/modification of specific allocations to driving situation classes.

A particular problem with regard to different neural nets or those which require different training arises from the fact that regionally, significant differences can exist in the marginal conditions, thus requiring variations for different countries or different regions. For example, traffic in China greatly differs from traffic in Europe, for example Germany, which not only applies due to different statutory regulations in the countries. Different traffic environments can also result from different markings, for example, yellow median strips compared to white median strips and/or the presence or absence of red-/blue-colored curbs (such as in the USA), and the like.

Therefore, an advantageous embodiment of the present invention also provides that the driving situation classes also describe a country currently driven in, and/or at least one configuration parameter set specific for at least one country is used. As a result, a type of variation management is provided, for example, for different countries. Of course, such a variety of versions can also be transferred to further basic distinguishing criteria, for example, differences in weather and/or other regional differences.

Especially, when many different analysis functions/many different neural nets are supposed to be realized, it is particularly advantageous if an embodiment of the present invention provides that the configuration parameter sets are retrieved from the database located on a motor vehicle-external central processing unit. This means that the database with the configuration parameter sets does not necessarily have be provided within the motor vehicle but can also be provided on a motor vehicle-external central processing unit, for example, a server, with which the motor vehicle is in wireless contact. The wireless contact can be provided via a mobile network and/or the internet.

A particularly preferred embodiment of the present invention provides that in case of a driver intervention, which indicates a wrong result of an analysis unit, an error dataset of the current traffic situation, particularly comprising driving situation data, the configuration of the computing structure, and the intervention data describing the driver intervention, is transmitted to a processing device or the motor vehicle-external central processing unit after the traffic situation is concluded. As a result, the problem of keeping a larger number of different neural nets used in motor vehicles continuously current or to improve them with regard to behavior/performance, is solved. If a traffic situation or driving situation arises, in which the neural net reacts incorrectly, for example, a premature return to a lane with a motorcycle due to a weather condition during an overtaking maneuver, the driver must ultimately intervene, for example, to prevent an accident. The problem addressed is that with a neural net, it is not possible to compute and test a completely replicable behavior for all situations; instead, only a statistical test is possible. This is in contrast to a program code that can be tested absolutely deterministically.

It is thus proposed to store in an error dataset, preferably together with all further relevant error data, particularly the driving situation data and the current configuration of the computing structure, the driving maneuver executed by the driver, i.e. the driving intervention, which is described, for example, by the intervention data, wherein the error dataset is transmitted to a central IT back-end, i.e. a motor vehicle-external central processing unit, which, in one embodiment, in which the configuration parameter sets are retrieved externally from the motor vehicle, is preferably the same motor vehicle-external, central processing unit, on which the database is located. In the motor vehicle-external, central processing unit, error datasets and those for similar traffic situations (in the example, error datasets for overtaking maneuvers on the interstate highway at a specific speed, with motorcycles) are collected from all correspondingly equipped motor vehicles, thus from an entire vehicle fleet. These error datasets can now be used to train the corresponding neural net, preferably when a training condition is met. If the training condition occurs, the error datasets are used for training the at least one neural net used in the traffic situation, while the associated configuration parameter set is updated. Then, the configuration dataset in the motor vehicles is updated, i.e. the updated configuration parameter sets are again made available to the motor vehicles, and so a type of swarm intelligence is provided. It is thus possible to improve the artificial intelligence of the entire vehicle fleet by means of the error datasets of individual motor vehicles/drivers. A continuous, consistent learning and training process is generated.

Moreover, it is conceivable that the exceedance of a threshold value for the number of error datasets available for a neural net is used as training condition, wherein, however, other training conditions can also be used. In addition, if the configuration parameter sets are not already retrieved from the motor vehicle-external, central processing unit, they are transmitted to the motor vehicle, where the correspondingly available database can be updated. If the same configuration dataset present in the motor vehicle is used in the back-end for training, only a synchronization of the databases is required. By means of the flexible schema in the database, it is also possible to update and thus implement larger changes in the neural nets.

In this context, it must be noted that the present invention also allows for the use of personalized or motor vehicle-specific configuration parameter sets. In such case, different configuration parameter sets can be present for different motor vehicles and/or drivers. If the training, particularly due to error datasets, is also driver-specific, making it possible to learn the driver's driving style particularly in case of positive driving decisions, it must be made sure that during training in the back-end, the correct, current version of the person- and motor vehicle-specific configuration parameter set it used.

In addition to the method, the present invention also relates to a motor vehicle, having a motor vehicle system which is designed to guide the motor vehicle in different driving situation classes in a fully automated manner, with a control device designed for executing the method according to the invention. All embodiments with regard to the method according to the invention can be applied analogously to the motor vehicle according to the invention, with which it is also possible to achieve the above-mentioned advantages.

Further advantages and details of the present invention can be derived from the embodiments and the drawing described in the following.

Figure 2:
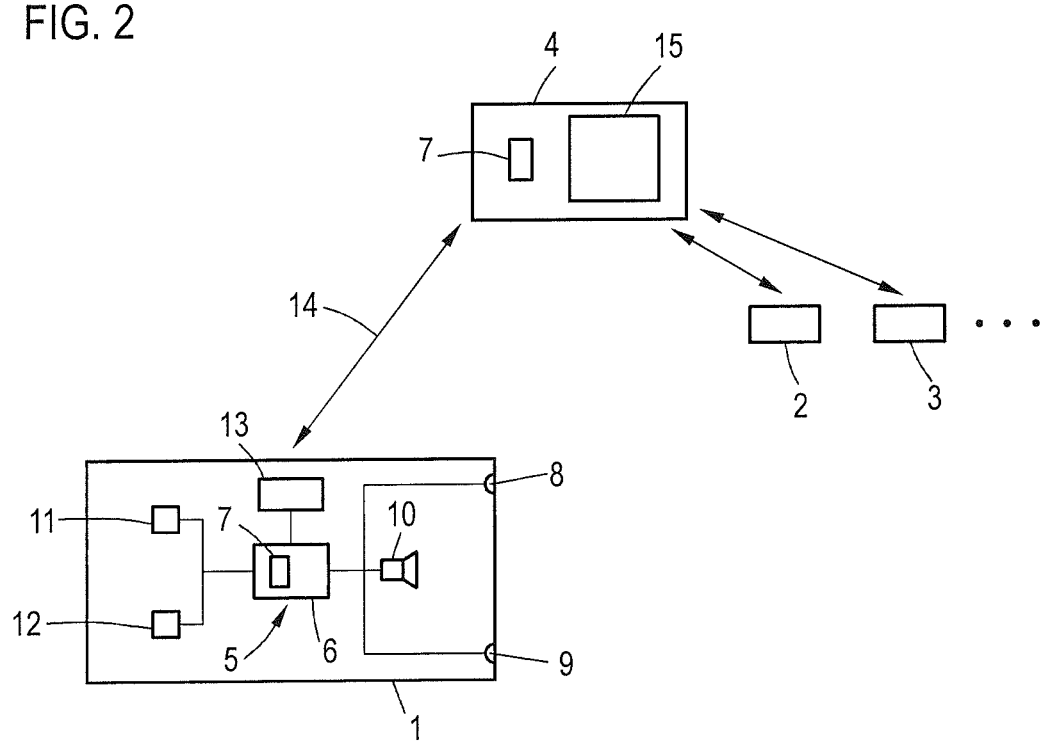
FIG. 2 illustrates a system with a motor vehicle according to the disclosure.

FIG. 1 shows a flowchart of an embodiment of the method according to the invention, and FIG. 2 shows a system with a motor vehicle according to the invention.

FIG. 1 shows a flowchart of an embodiment of a method according to the invention. It is used for operating a motor vehicle system designed to guide a motor vehicle in a fully automated manner, wherein the vehicle system can be used in different driving situation classes, i.e. under different operating conditions or for different purposes. Ideally, the vehicle system is designed for guiding the motor vehicle in a fully automated manner in every common traffic situation, thus in all driving situation classes common in traffic. Driving situation classes are exemplarily defined by a driving surroundings (city traffic, rural road, interstate highway, . . . ), as it can be determined using a current position information from a digital map, and a speed interval which, for example, can be used to differentiate between congestion situations on the interstate highway and a high-speed operation on an interstate highway. Of course, further and/or other driving situation classes are conceivable, for example, a specific driving situation class for a parking process.

The fully automated guidance of the motor vehicle is indicated in step S1 in FIG. 1. It uses a computing structure which can contain hardware and/or software components, and ascertains from driving situation data the control data for other vehicle systems, which are thus used to realize the fully automated guidance of the motor vehicle. Therefore, control data can describe particularly longitudinal guidance interventions, lateral guidance interventions and/or other measures, for example, a re-parameterization of a further vehicle system. The surroundings data describing the surroundings of the motor vehicle as well as ego data of the motor vehicle, which describe its current, particularly dynamic state, are used as driving situation data.

The computing structure comprises analysis units which each determine output data from input data. The input data can at least to some extent be driving situation data and/or at least to some extent be output data of other analysis units. Output data of one analysis unit can be used as input data for at least one other analysis unit, but can already also constitute control data. At least some of the analysis units are designed as a neural net in order to utilize artificial intelligence. The realization is at least partly software-based, wherein hybrid forms are quite conceivable, in which a hardware, which is especially suitable for realizing a neural net, for example, a neural chip, is used, which is subsequently used as runtime surroundings by a software that implements the specifically desired neural net.

Since only a maximum number of neural nets is supposed to be operated simultaneously, the present invention addresses the option of making dynamically suitable neural nets available as analysis units. Specifically, in a step S2, a current driving situation class is determined which is particularly possible using driving situation data (and if need be, output data from analysis units) and/or by means of a neural net. In the present case, different variations also exist for different countries for the driving situation classes, wherein the actual presence in a country can easily be determined using a current position information, for example, ascertained via a GPS-Sensor of the motor vehicle. In addition, driving situation classes can also differ with regard to the presence of specific objects in the surroundings of the motor vehicle. Expediently, a neural net for object recognition and classification is moreover kept basically active in the computing structure, wherein its output data are taken into account for the determination of the driving situation class. For example, it is thus possible to differentiate between a driving situation class "congestion on interstate without presence of people" and "congestion on interstate with presence of people."

It is now essential that specific analysis functions, which are meaningful or required in the driving situations or traffic situations of this driving situation class, are associated with each driving situation class. These analysis functions, which are associated with the driving situation classes, are supposed to be realized as analysis units through dynamically available neural nets. For that purpose, a configuration parameter set exists for each analysis function in the database. The configuration parameter set can be used to form an analysis unit from a configuration object. The configuration object can partially be formed from hardware, for example, a neural chip, and/or be completely realized by software, wherein, for example, by means of the configuration parameter set, an entity of a class object (of a rudiment structure class) can be produced which then forms the analysis unit and is integrated into the computing structure.

In a step S3, it is thus verified, whether the driving situation class has changed. If this is not the case, it will continue to be monitored for changes. However, in case of a change of the driving situation class, the analysis functions to be used are retrieved in step S4 from the database as configuration parameter sets. In a step S5, neural nets, which realize analysis functions not associated with the driving situation class, namely analysis units, are deactivated, wherein analysis units to be newly added are additionally produced from the configuration parameter sets and activated.

In an example, the neural nets related to parallel traffic situations with different lanes are deactivated, when the driver exits an interstate highway, thus transitions from interstate highway traffic to rural road traffic, wherein, however, neural nets relating to oncoming traffic in the same lane, for example, can be produced and activated due to configuration parameter sets. At this juncture, it must also be pointed out that the computing structure itself can naturally also be adjusted to the runtime such that the new analysis units, which realize neural nets, are integrated in the overall computation process for the control data.

By taking into account currently traveled countries, it is also possible to cover a variety of versions of different countries/geographical regions, for example, different legislative regulations, wherein other approaches of creating variations can naturally be pursued, for example, regional differences, particularly regarding road identifications, and the like, can be taken into account. Weather conditions can also result in a variation differentiation and thus be integrated into driving situation classes. Due to the effective storage in the database, a great number of configuration parameter sets can be made available, and a great number of driving situation classes can thus be realized which are broken down not only fundamentally, as shown in the example, by driving surroundings and speed interval but also cover variations, for example, countries, regions, weather conditions, and the like.

As can be seen in FIG. 1, the dynamic update operation takes place continuously parallel to the fully automated guidance of the vehicle; it can therefore be monitored cyclically or continuously whether a driving situation class changes.

However, FIG. 1 also shows a further parallel step sequence. Specifically, during the fully automated vehicle guidance, a further monitoring takes place to determine whether an error has occurred that necessitates a driver intervention. If this is determined in a step S6, in a step S7, data for an error dataset are collected which presently comprises driving situation data, the current configuration of the computing structure, particularly, the analysis units which realize neural nets and are active, and intervention data describing the intervention of the driver. This error dataset is transmitted in a step S8 to a central processing unit, which also contains at least one copy of the database. While it is quite conceivable within the scope of the present invention to retrieve configuration parameter sets via a wireless connection from a database stored in the central processing unit, it is preferred and realized in this embodiment that databases are provided both in the motor vehicle (in case the wireless connection to the motor vehicle-external, central processing unit malfunctions) and the central processing unit, wherein the database in the motor vehicle is synchronized with the database in the central processing unit.

The error datasets received by the central processing unit are stored in the central processing unit and, in the event of a training condition, for example, the presence of a specific number of error datasets with regard to a specific neural net utilized, are used to train and thus update the corresponding neural net. This is particularly advantageously possible once a plurality of motor vehicles designed according to the invention communicate with the central processing unit and are able to transmit their error datasets. A configuration parameter set thus updated is distributed back to the motor vehicles, providing them with the most current version.

The learning process for the neural nets, which results in the updating of the configuration parameter set, can be achieved in different ways, as is basically known in the prior art, for example, by a modification of the weights, a modification of the threshold values, a change of the activation functions, the adding of new neuron connections, or the deleting of neuron connections, and the like. It must be noted that within the framework of the method, neural nets, which can internally update themselves during the runtime, for example, by changing the weights on the basis of the activities of other neurons, and the like, can also be used.

FIG. 2 shows a complete system, consisting of a vehicle fleet with motor vehicles 1, 2, 3, etc. according to the invention and a motor vehicle-external, central processing unit 4, which acts as IT back-end. The motor vehicle 1, which is shown in more detail, has, similar to the motor vehicles 2 and 3, the vehicle system 5 designed for guiding the motor vehicle in a fully automated manner, and in the control device 6 of which a database 7 is stored which contains, as described, configuration parameter sets associated with driving situation classes. The control device 6 is designed to execute the method according to the invention, as was described for FIG. 1.

For that purpose, the control device 6 is connected by means of at least one bus system to surroundings sensors 8, 9, 10 of the motor vehicle 1 but also to further vehicle systems 11, 12, which can serve as sources for driving situation data, but which can also be vehicle systems to be controlled. In particular, the motor vehicle 1 also has a communication device 13, by means of which the wireless connection 14 to the central processing unit 4 can be established.

The motor vehicles 2, 3 are designed in accordance with motor vehicle 1.

The processing unit 4 also has a current copy of the database 7, wherein a storage device 15 for the error datasets, which can be supplied by the motor vehicles 1, 2, 3, is additionally provided. As was described with regard to the method, the error datasets can be used for training the neural nets and thus for updating the configuration parameter sets in the database 7.

The invention claimed is:

1. A method for operating a motor vehicle system, which is designed to guide a motor vehicle in different driving situation classes in a fully automated manner, the method comprising:
    dynamically producing, from a configuration object and using configuration parameter sets, at least some of analysis units designed as neural nets at least partly using software, during runtime,
    wherein a computing structure comprising the analysis units is used to ascertain control data as driving situation data for guiding the motor vehicle in the fully automated manner and is used to use the control data to guide the motor vehicle, the control data is ascertained from surroundings data describing surroundings of the motor vehicle and ego data describes a state of the motor vehicle,
    wherein each analysis unit is configured to ascertain output data from output data of at least one other analysis unit or the driving situation data, and
    wherein the dynamically producing the at least some of analysis units comprises:
        ascertaining a current driving situation class from multiple specified driving situation classes using at least some of the driving situation data, wherein each driving situation class is assigned at least one analysis function,
        retrieving, from a database, the configuration parameter sets assigned to analysis functions of the current driving situation class, and
        producing analysis units that carry out the analysis functions of the current driving situation class and that have not yet been provided by configuring configuration objects using the retrieved configuration parameter sets.

2. The method according to claim 1, further comprising: determining the current driving situation class using a neural net.

3. The method according to claim 1, further comprising: deactivating analysis units configured as neural nets that perform analysis functions and are not associated with the current driving situation class.

4. The method according to claim 1, wherein a maximum number of the analysis units that are based on the neural nets are simultaneously active.

5. The method according to claim 1, wherein at least one analysis unit, which realizes a basic function through a neural net, is always active.

6. The method according to claim 5, wherein the basic function is an object recognition or a classification function.

7. The method according to claim 1, wherein the multiple specified driving situation classes describe a country currently driven in, or at least one configuration parameter set specific for at least one country is used.

8. The method according to claim 1, wherein the retrieving the configuration parameter sets from the database comprises:
retrieving the configuration parameter sets from the database located on a motor vehicle-external central processing unit.

9. The method according to claim 1, further comprising:
in response to a driver intervention, which indicates a wrong result of an analysis unit, transmitting an error dataset of a current traffic situation to a processing device or a motor vehicle-external central processing unit after the current traffic situation is concluded.

10. The method according to claim 9, further comprising:
in response to a training condition being met, using the error dataset for training at least one neural net used in the current traffic situation, while the associated configuration parameter set is updated.

11. A motor vehicle, comprising:
a motor vehicle system configured to guide the motor vehicle in different driving situation classes in a fully automated manner; and
a control device configured to:
dynamically produce, from a configuration object and using configuration parameter sets, at least some of analysis units designed as neural nets at least partly using software during runtime,
wherein a computing structure comprising the analysis units is used to ascertain control data as driving situation data for guiding the motor vehicle in the fully automated manner and is used to use the control data to guide the motor vehicle, the control data is ascertained from surroundings data describing surroundings of the motor vehicle and ego data describes a state of the motor vehicle,
wherein each analysis unit is configured to ascertain output data from output data of at least one other analysis unit or the driving situation data, and
wherein to dynamically produce the at least some of analysis units, the control device is configured to:
ascertain a current driving situation class from multiple specified driving situation classes using at least some of the driving situation data, wherein each driving situation class is assigned at least one analysis function,
retrieve, from a database, the configuration parameter sets assigned to analysis functions of the current driving situation class, and
produce analysis units that carry out the analysis functions of the current driving situation class and that have not yet been provided by configuring configuration objects using the retrieved configuration parameter sets.

12. The motor vehicle according to claim 11, wherein the control device is further configured to:
determine the current driving situation class using a neural net.

13. The motor vehicle according to claim 11, wherein the control device is further configured to:
deactivate analysis units configured as neural nets that perform analysis functions and are not associated with the current driving situation class.

14. The motor vehicle according to claim 11, wherein a maximum number of the analysis units that are based on the neural nets are simultaneously active.

15. The motor vehicle according to claim 11, wherein at least one analysis unit, which realizes a basic function through a neural net, is always active.

16. The motor vehicle according to claim 15, wherein the basic function is an object recognition or a classification function.

17. The motor vehicle according to claim 11, wherein the multiple specified driving situation classes describe a country currently driven in, or at least one configuration parameter set specific for at least one country is used.

18. The motor vehicle according to claim 11, wherein to retrieve the configuration parameter sets from the database, the control device is configured to:
retrieve the configuration parameter sets from the database located on a motor vehicle-external central processing unit.

19. The motor vehicle according to claim 11, wherein the control device is further configured to:
in response to a driver intervention, which indicates a wrong result of an analysis unit, transmit an error dataset of a current traffic situation to a processing device or a motor vehicle-external central processing unit after the current traffic situation is concluded.

20. The motor vehicle according to claim 19, wherein the control device is further configured to:
in response to a training condition being met, use the error dataset for training at least one neural net used in the current traffic situation, while the associated configuration parameter set is updated.

* * * * *